United States Patent

Chandross et al.

Patent Number: 5,773,486
Date of Patent: Jun. 30, 1998

[54] METHOD FOR THE MANUFACTURE OF OPTICAL GRATINGS

[75] Inventors: Edwin Arthur Chandross, Berkeley Heights; Mark Anthony Paczkowski, Andover; Debra Ann Simoff, South Plainfield, all of N.J.

[73] Assignee: Lucent Technologies Inc., Murray Hill, N.J.

[21] Appl. No.: 720,253

[22] Filed: Sep. 26, 1996

[51] Int. Cl.$^6$ .................................................. C08F 2/46
[52] U.S. Cl. ........................ 522/33; 522/14; 522/28; 522/68; 65/385
[58] Field of Search ........................... 522/33, 75, 78, 522/42, 40, 41, 43, 44, 45, 68, 14, 28; 65/385

[56] References Cited

U.S. PATENT DOCUMENTS

| | | | |
|---|---|---|---|
| 3,475,306 | 10/1969 | Clocker | 204/159.23 |
| 4,725,110 | 2/1988 | Glenn et al. | 350/3.61 |
| 4,780,486 | 10/1988 | Lee et al. | 522/14 |
| 4,923,915 | 5/1990 | Urruti | 524/102 |
| 4,973,611 | 11/1990 | Puder | 522/42 |
| 5,182,786 | 1/1993 | Kinaga et al. | 385/128 |
| 5,238,974 | 8/1993 | Yamamoto et al. | 522/75 |
| 5,327,515 | 7/1994 | Anderson et al. | 385/123 |
| 5,352,712 | 10/1994 | Shustack | 522/31 |
| 5,527,835 | 6/1996 | Shustack | 522/42 |
| 5,536,529 | 7/1996 | Shustack | 427/163.2 |
| 5,587,403 | 12/1996 | Shustack | 522/42 |
| 5,620,495 | 4/1997 | Aspell et al. | 65/392 |

FOREIGN PATENT DOCUMENTS 5-70536  3/1993  Japan ..................... C08F 299/06

*Primary Examiner*—Christopher D. Rodee
*Assistant Examiner*—Steven H. VerSteeg

[57] ABSTRACT

The specification describes techniques for the manufacture of optical gratings in optical fibers. The grating pattern is written into the core of the fiber without removing the fiber coating. Coating compositions with high transparency to the actinic (writing) radiation but which are UV curable are described in detail. The coating compositions contain a UV photoinitiator that absorbs sufficient UV radiation to effectively cure the polymer but is relatively transparent to UV radiation used for writing the grating. The photoinitiator is one or more compounds selected from a specified group of aliphatic and cycloaliphatic ketones.

15 Claims, 3 Drawing Sheets

METHOD FOR THE MANUFACTURE OF OPTICAL GRATINGS

FIELD OF THE INVENTION

This invention relates to methods for forming optical gratings in glass optical fibers. More specifically, it relates to optical fiber coating materials that are formulated to facilitate forming photodefined gratings in glass fibers by irradiating the glass through a relatively transparent polymeric coating material. This technique allows gratings to be formed without the need for stripping the fiber coating and reapplying additional coating material after the grating is formed.

BACKGROUND OF THE INVENTION

Optical gratings formed in the core of optical fibers have been proposed for a variety of uses and have become important optical components for designers of lightwave systems and devices. Applications include such devices as semiconductor laser stabilizers and pump reflectors, cavity resonators for fiber lasers, dispersion compensators, filters for add/drop signal control, optical amplifier gain equalizing filters, and strain sensors for architectural structures.

The discovery of optical amplifiers using doped glass fibers as the optical amplifying medium has drastically changed optical transmission technology. Doped glass fiber amplifiers, in particular erbium-doped fiber amplifiers, have now largely replaced optoelectric repeaters in long haul communications. These devices have become so efficient and cost effective that a large number of new applications, e.g. loop communications, and local area networks are under serious consideration. Thus the demand for these devices has changed from a few thousand per year to a prospective hundreds of thousands annually. These devices are true optical amplifiers, and operate by photon stimulated emission of inverted population states in the erbium atoms. The operation resembles the operation of a laser in a traveling wave mode. The optical fiber amplifier is a simple structure, the primary element being a length of appropriately doped glass. The virtue of the device is that it connects conveniently at both ends to a standard transmission fiber. The optical pump in a typical amplifier device is coupled into the doped fiber through a fiber pigtail or equivalent coupler.

Doped fiber amplifiers typically use pump sources that emit at a wavelength substantially removed from the signal wavelength. The usual signal wavelength is near 1.5 $\mu$m, and in the case of erbium-doped devices the pump wavelength that is most efficient is near 0.96 $\mu$m. To prevent the pump wavelength from mixing with the optical signal, doped fiber amplifiers typically employ optical gratings in the core of the doped fiber section at each end of the amplifier to isolate the pump radiation from the signal path outside of the amplifier. This illustrates only one of the many applications of optical gratings noted earlier.

Optical gratings useful in such applications are typically produced by photoinducing refractive index changes in the core of an appropriately sensitized glass fiber. The desired grating pattern is formed by using actinic radiation (typically an excimer laser-pumped frequency doubled dye laser operating near 240 nm) with a varying intensity or periodicity along the length of the fiber. This is conveniently done using a photomask, or by using a patterned light beam produced, e.g., by an interference pattern. The refractive index changes are produced typically by UV induced changes at defect sites of an absorbing ion such as germanium. The germanium doped fiber may be sensitized by hydrogen or deuterium treatments known in the art. Very large (>0.01) refractive index changes can be obtained in such a process. These techniques for forming optical gratings are well known in the art and are described in e.g. U.S. Pat. Nos. 4,725,110, issued Feb. 16, 1988 and 5,327,515, issued Jul. 5, 1994, both of which are incorporated herein by reference.

While the photochemical process for forming these optical gratings is very effective, it usually requires the removal of the polymer coating from the fiber so as to allow the actinic light (UV) to reach the core with sufficient intensity to effect the desired transition. The coating may be stripped from the grating region by various means, e.g. by dissolving the polymer in sulfuric acid. After the grating is formed the portion of the fiber from which the coating was stripped must be recoated or otherwise mechanically protected from abrasion. The processing required to remove and later replace the fiber coating has proved to add more than 50% to the cost of manufacturing the grating. Moreover, stripping and recoating the fiber reduces yield due to proof test failures. It is important to find effective manufacturing techniques that avoid the cumbersome and costly operations just described.

Attempts have been made to form the grating by exposing bare glass fiber to UV patterns during the draw operation but these have met with limited success.

An approach to simplifying fiber grating forming that shows considerable promise is described and claimed in copending patent application Ser. No. 08/515,625, now U.S. Pat. No. 5,620,495. The process described in that application involves exposing the fiber to the actinic radiation through the polymer fiber coating. That expedient eliminates the cumbersome steps of removing the fiber coating in the vicinity of the grating and reapplying coating material after the grating is formed. Following this teaching, the polymer coating must be substantially transparent to the UV radiation used to form the grating. Typical polymer coating materials used in commercial practice are not highly UV transparent. The patent application mentioned above teaches various polymer coating materials that can be formulated to be sufficiently UV transparent to allow the formation of the grating with radiation directed through the coating.

Manufacturing techniques for commercial fibers involve drawing the glass fiber from a glass preform and coating the fiber with a liquid polymer immediately after drawing. This sequence is essential due to the fragility of uncoated fibers. The liquid polymer must be cured or otherwise solidified very rapidly to allow the fiber to be drawn and reeled at a workable and commercially attractive draw speed. The cure mechanism predominantly used in commercial practice is UV induced polymerization. This mechanism involves use of a coating composition that polymerizes by free radical formation. The free radicals are produced through photoinitiation of a UV photoinitiator. To facilitate rapid curing the UV sensitive polymer coating compositions have been carefully engineered to optimize the effectiveness of the photoinitiation process. The amount of photoinitiator typically ranges from 0.1–10%. The amount of photoinitiator is kept low for reasons of economy and also to minimize the effect of the photoinitiator on the mechanical and aging properties of the coating. A key property in keeping the concentration of photoinitiator low and the free radical formation of the photoinitiator high is use of a photoinitiator material with substantial UV absorption. This key property is fundamentally in conflict with a grating forming process in which the grating forming radiation is UV light. In that case, which is virtually the universal case in commercial practice, forming the fiber grating by exposure through the coating has limited effectiveness.

STATEMENT OF THE INVENTION

We have developed polymer coating materials that can be cured by UV radiation in a conventional fiber draw operation and which also allow substantial UV transparency for the actinic radiation used to form fiber gratings. These coating materials have photoinitiators that absorb sufficiently at the wavelengths used in conventional fiber draw operations but are relatively transparent at the wavelengths used for forming the fiber grating. These photoinitiators are aliphatic (dialkyl) ketones and mixtures of aliphatic ketones represented by the generic formula:

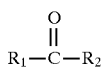

where $R_1$ and $R_2$ are alkyl moieties selected from the group consisting of methyl, ethyl, propyl, isopropyl, butyl, isobutyl, sec-butyl, t-butyl, pentyl and neopentyl, and additionally where the compound molecular weight is greater than 100. The aliphatic ketone photoinitiator (AKP) compound may be either symmetric or unsymmetric, i.e. $R_1$ and $R_2$ may be the same or different.

Additional photoinitiator compounds within the scope of the invention include aliphatic ketones where $R_1$ and $R_2$ are joined, i.e. cycloaliphatic ketones.

As is well known, the function of the photoinitiator is to provide a source of free radicals capable of causing the conventional polymerization of the vinyl monomer or mixture thereof. Ketones do this through a bond-breaking process known as the Norrish Type I cleavage reaction, also well known. This subject has been reviewed by Dr. D. S. Weiss of the Eastman Kodak Co. in "Organic Photochemistry," Volume 5 (ed. A Padwa), Marcel Dekker, New York, 1981, pp. 347–420.

The efficiency of free radical formation, the quantum yield of the Norrish cleavage, is known to depend on several factors. Important ones are the stability of the radicals formed upon bond cleavage and ring strain in various cycloaliphatic ketones. The former is increased by the presence of a phenyl group on the α-carbon atom of the ketone, or by the incorporation of one or more methyl groups at such atom(s). Thus one may expect that ketone groups incorporated in rings smaller than six membered will be especially effective initiators, and that strained bicyclic ring systems, such as camphor, will be attractive photoinitiators.

The base polymer in these formulations is also chosen to minimize photon absorption and scattering in the deep UV region used for grating formation. The UV absorption characteristics of the polymers are strongly influenced by the bonds between atoms in the polymer chain. Desired bonds for UV transparency are selected from the group consisting of C—C, C—H, C—O, O—H, C—S, S—H, C—F, C—Cl, C—Si, Si—O. Bond groups to be avoided or minimized are unsaturated and conjugated bonds (including aromatics). Other strongly absorbing atoms are also to be avoided or minimized, as are scattering sources such as crystallites or phase-separated regions that are large relative to the period of the grating to be produced.

DETAILED DESCRIPTION

Figure 1:
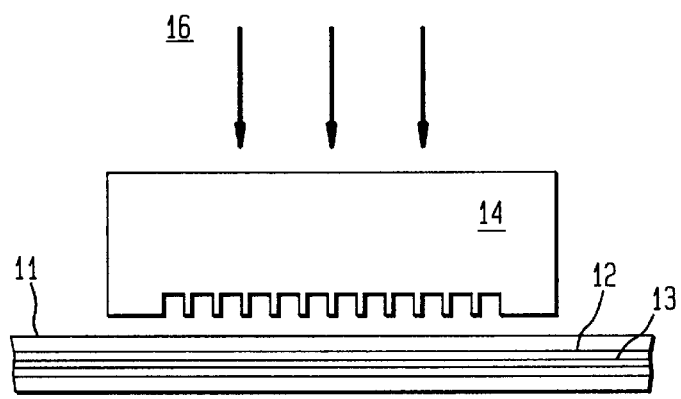
FIG. 1 is a schematic representation of the process for forming gratings in the core of an optical fiber.

Referring to FIG. 1, an optical fiber is shown with polymer coating 11, cladding 12, and core 13. The coating may comprise more than one layer, but a single layer is preferred. A UV laser source represented by arrows 15 is shown incident on an $SiO_2$ phase mask 14. UV radiation is diffracted into a light pattern of fine lines by the phase mask and is incident on the fiber core 13 after passing through the polymer coating 11 and the cladding layer 12. More details on this process can be found in the aforementioned U.S. Pat. No. 5,620,495.

The preferred UV source for forming the grating is an excimer laser-pumped frequency doubled dye laser operating at a wavelength around 240 nm, although other sources may be employed. In general, to be effective in forming the desired refractive index changes, the radiation should be in the band 235–260 nm. By contrast the typical UV radiation used to cure polymer coatings in commercial fiber drawing operations is at or near 360 nm. As pointed out earlier most commercial polymer coating materials are formulated to maximize UV absorption by the curing radiation (250–400 nm). These materials absorb strongly throughout much of the UV band and have enough absorption in the 235–260 nm range that gratings cannot be written through them without substantial damage to the coating itself.

Figure 2:
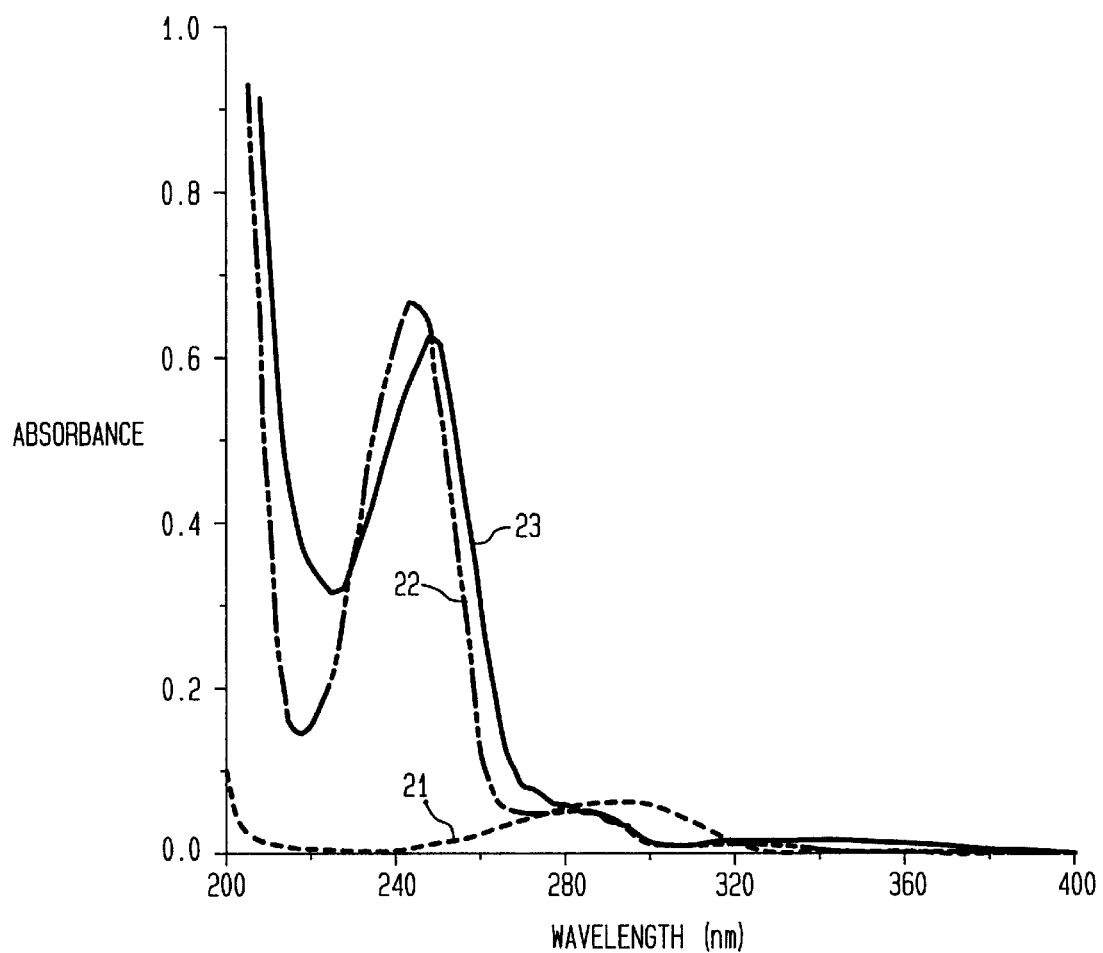
FIGS. 2–4 are a plots of absorption (abscissa) vs. wavelength (ordinate) illustrating the desirable properties of coating materials according to the invention.

An AKP material according to the invention was compared with other commercial photoinitiator materials to demonstrate its apparent lack of utility for practical optical fiber coatings, and thereby establish that it shows unexpected utility when used according to the teachings of the invention. This comparison further serves to illustrate the greater inherent UV transparency of the AKP. A UV spectrum was obtained for methyl t-butyl ketone and compared to spectra taken of two widely used commercial aromatic free radical photoinitiators from CIBA, Irgacure™ 184 and Irgacure™ 651. Spectra were collected by diluting the photoinitiators in hexane and scanning in a quartz cuvette having a 50 μm path length. The AKP concentration was 5 wt %, while that of the commercial photoinitiators was 0.2 wt %. The results are shown in FIG. 2 where absorbance is plotted vs. wavelength in nm. Curve 21 shows results for the AKP of the invention, curve 22 shows results for Irgacure 184 and curve 23 shows results for Irgacure 651. As seen, the AKP material of the invention is much less absorbing at 240–260 nm than the commercial photoinitiators, despite being 25 times more concentrated. Thus it would not be evident to those skilled in the art that the AKP material would be an obvious candidate for a photoinitiator following conventional practice.

In general, the photoinitiator types described here are less efficient than those conventionally used. To enhance curing efficiency, a number of steps can be taken. Curing efficiency may be improved upon incorporation of synergists such as thiols or amines as is known in the art. Di- or multi-functional thiols are preferred, since their chain-terminating behavior would be less detrimental to the build-up of crosslink density than a mono-functional thiol. Candidate synergists should be non-aromatic. UV curing should typically be carried out under an inert purge (e.g., nitrogen) to minimize inhibition of the cure by oxygen. A variety of UV curing lamp sources may be used, but preferred sources are those which emit with significant intensity at wavelengths below about 310 nm. One such lamp is a Fusion Systems Type H bulb. High curing efficiency would also be expected with excimer UV lamps recently announced by Fusion Systems, which emit strongly near 300 nm.

Oxidative stability may be improved by incorporation of hindered amine, hindered acylamine, or hindered aminoether stabilizers. A particularly preferred stabilizer is Tinuvin 123™ (Ciba Additives). Oxidative stability and curing efficiency may both be enhanced by incorporation of selected aliphatic thiols.

Following UV curing, certain components of the coating may be present that are not crosslinked into the polymer network, including residual unreacted photoinitiator or monomer. These could be detrimental for optimum grating writing because the residues may absorb the actinic radiation and block formation of the grating pattern, or could deposit on the mask. Optionally, the coated fiber may be post-treated to remove such components, e.g. by thermal devolatization, vacuum exposure, or a combination of such methods.

According to the invention we incorporate an aliphatic ketone in the polymer to act as the photoinitiator in the following examples.

EXAMPLE 1

Figure 3:
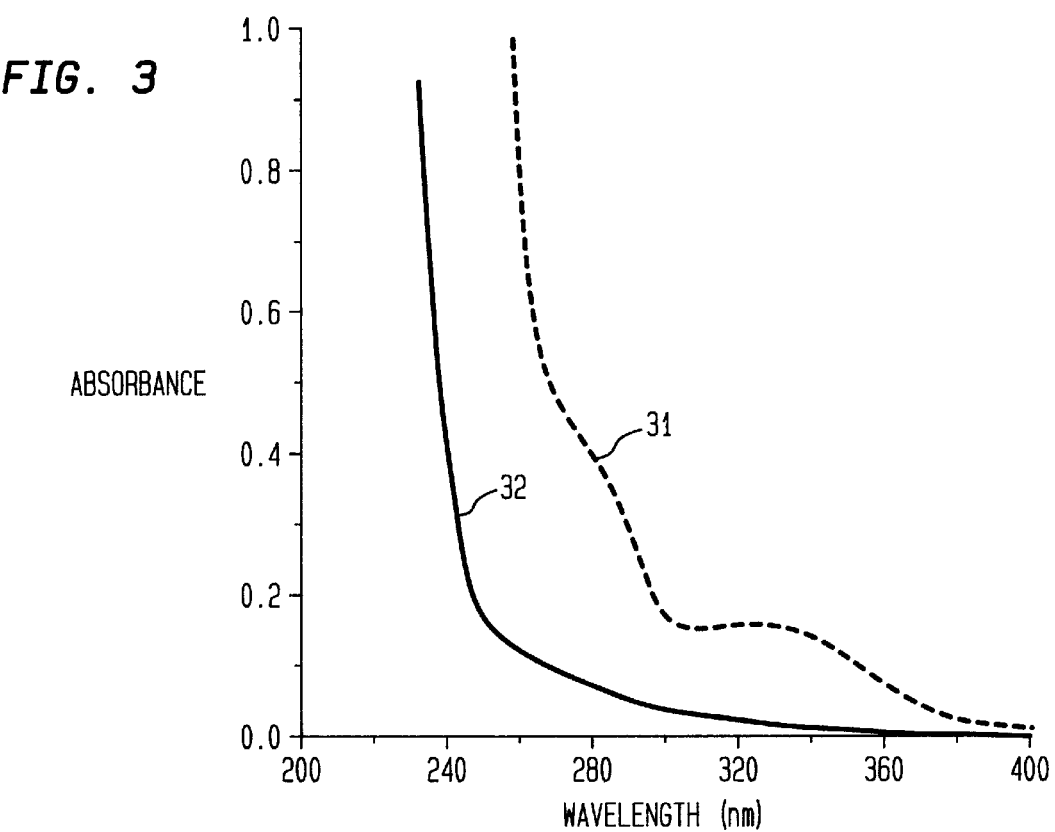

UV spectra were collected and compared for films of two formulations based on a low viscosity aliphatic polyester acrylate oligomer, CRAYNOR™ CN920 (Sartomer Corp.). The first formulation incorporated 2.5 wt % Darocur™ 1173 (E.M. Merck), a widely used commercial photoinitiator whose absorption is comparable to that of Irgacure™ 184 and Irgacure™ 651. The second used an AKP material, 2.5 wt % methyl t-butyl ketone. Both were cured as 22 $\mu$m films between quartz plates. Results are shown in FIG. 3 with the film containing Darocur 1173 designated 31 and the film with the AKP material designated 32. The film containing Darocur 1173 shows a UV absorbance of greater than 1 at 257 nm, while the film with the AKP material shows an absorbance of only 0.13 at the same wavelength.

EXAMPLE 2

Figure 4:
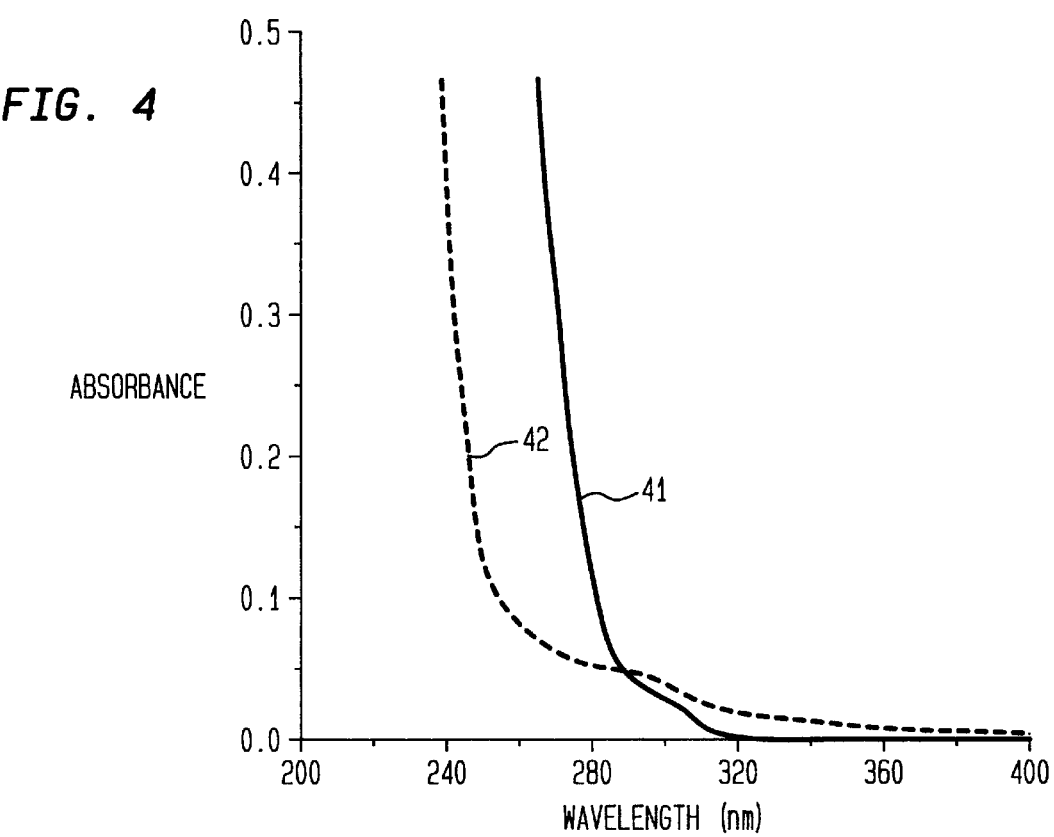

Various additional aliphatic ketones were screened for their suitability in the method of this invention, i.e. to serve as adequate UV photoinitiators while still providing good UV transparency for grating writing through the coating. Screening was done by admixing each material in a low UV absorbing monomer, propoxylated neopentyl glycol diacrylate (PNPGDA), then curing a film of each mixture by pressing a drop between quartz plates (22 $\mu$m spacers) and subjecting each sample to one slow pass on a conventional curing station with either a mercury lamp or a Fusion Systems Type H bulb. The UV dose was approximately 2 $J/cm_2$ as measured using an IL390 Light Bug radiometer. UV absorbance spectra of the films were recorded over the range 200–400 nm. As an example, the spectra for PNPGDA containing 2.44 wt % methyl t-butyl ketone, before and after cure, are shown in FIG. 4. The result for uncured material is indicated by curve 41 and the cured material by curve 42. The absorbance values at 250 nm are noted in Table 1. "$R_1$" and "$R_2$" correspond to the moieties of formula (1) above. Photoinitiators that resulted in a cured film absorbance of less than or equal to 0.15 generally produce optical fiber coating materials with satisfactory mechanical characteristics and were therefore assessed as "good", while those providing an absorbance of 0.15–0.35 were assessed as "fair".

TABLE 1

| Photoinitiator (PI) | Formula Weight | Wt % PI | Mole % PI | $R_1$ | $R_2$ | Cured Film Absorbance @ 250 nm | UV Initiation Performance |
|---|---|---|---|---|---|---|---|
| ALKYL KETONES | | | | | | | |
| Pinacolone | 100.16 | 2.44 | 7.57 | methyl | t-butyl | 0.13 | Good |
| 2-Methyl-3-pentanone | 100.16 | 2.45 | 7.59 | ethyl | isopropyl | 0.14 | Good |
| 3-Hexanone | 100.16 | 2.42 | 7.51 | ethyl | propyl | 0.15 | Good |
| 3-Methyl-2-pentanone | 100.16 | 2.43 | 7.53 | methyl | sec-butyl | 0.16 | Fair/Good |
| 4-Methyl-2-pentanone | 100.16 | 2.43 | 7.53 | methyl | isobutyl | 0.22 | Fair |
| 2,4-Dimethyl-3-pentanone | 114.19 | 2.47 | 6.79 | isopropyl | isopropyl | 0.10 | Good |
| 4,4-Dimethyl-2-pentanone | 114.19 | 2.37 | 6.42 | methyl | neopentyl | 0.11 | Good |
| 2-Heptanone | 114.19 | 2.44 | 6.67 | methyl | pentyl | 0.24 | Fair |
| 3-Heptanone | 114.19 | 2.44 | 6.67 | ethyl | butyl | 0.27 | Fair |
| 4-Heptanone | 114.19 | 2.41 | 6.62 | propyl | propyl | 0.34 | Fair |
| 2,2,4,4-tetramethyl-3-pentanone | 142.24 | 2.42 | 5.40 | t-butyl | t-butyl | 0.13 | Good |
| 2,6-Dimethyl-4-heptanone | 142.24 | 2.44 | 5.45 | isobutyl | isobutyl | 0.27 | Fair |
| CYCLOALIPHATIC KETONES | | | | | | | |
| 2,2,6-Trimethylcyclohexanone | 140.23 | 3.42 | 7.58 | | | 0.21 | Fair |
| 3,3,5,5-Tetramethylcyclohexanone | 154.25 | 3.73 | 7.61 | | | 0.34 | Fair |
| 2-tert-Butylcyclohexanone | 154.25 | 2.44 | 5.05 | | | 0.27 | Fair |
| Menthone | 154.25 | 2.42 | 5.00 | | | 0.28 | Fair |

All of the monofunctional aliphatic ketones provided good or fair utility as curing agents, including cycloaliphatic ketones. The best performances were observed when the alkyl substituents on the ketone were from the group consisting of methyl, ethyl, isopropyl, t-butyl, sec-butyl and neopentyl. It was also observed that ketones in which one or both of the carbon atoms of the moieties attached to the carboxyl group were tertiary carbon atoms were generally superior.

Selected diketones were also tested, and it was observed that compounds having adjacent ketone groups tended to give higher UV absorption and generally "poor" performance. One diketone, tetramethyl 1,3-butadione, gave fair performance.

EXAMPLE 3

A modified version of a commercial hard urethane acrylate optical fiber coating resin was obtained in which the conventional photoinitiator and additives other than monomers and oligomers were deliberately omitted. The commercial resin is sold by Borden Company for use as the secondary (outer) coating on Enhanced D-LUX100™ dual-coated optical fiber. The base resin was selected as a starting formulation because it provides a useful property balance regarding viscosity, refractive index, and cured film mechanical properties (modulus, elongation, glass transition temperature). The coating also has excellent non-yellowing characteristics, which indicated that it might provide a reasonable UV transparency upon omission of the commercial photoinitiator. We prepared photocurable versions of the modified coating by adding methyl t-butyl ketone at 1–10 parts per hundred parts of resin (phr). Curing efficiency was improved by the addition of a thiol, such as pentaerythritol tetrakis(3-mercaptopropionate) or 3-mercaptopropyl trimethoxysilane.

The formulation described above, having 10 phr methyl t-butyl ketone and 2 phr pentaerythritol tetrakis (3-mercaptopropionate) was photocured onto an optical fiber (standard glass diameter of 125 $\mu$m) at a nominal coating thickness of 29 $\mu$m, using a nitrogen-purged 30" Iwasaki lamp and a draw speed of 1.1 m/s. The coating was well cured, as evidenced by the absence of detectable acrylate infrared absorbance at 810 cm$^{-1}$ using FTIR-ATR (Fourier transform infrared-attenuated total reflection) spectroscopy.

The germanium-doped fiber core of this fiber was then sensitized for grating writing by incorporation of 2.6 mole % deuterium under pressure. A 3% Bragg reflector at 1.55 $\mu$m was created by side-writing into the fiber core through the fiber coating using the arrangement shown schematically in FIG. 1. The laser was a frequency doubled dye laser pumped with a pulsed xenon fluoride excimer. The apparatus included a frequency doubling crystal tuned to an output wavelength of 245 nm with an output power of 18 mW at 490 nm, an interference mask with a period of 1.075 $\mu$m, and an exposure time of 10 s. After longer times at this power, the coating rapidly degraded and was ablated.

EXAMPLE 4

A grating was formed as in Example 3, except that the output power was decreased to 8 mW and the beam was defocused so that its focal point was 2.5 mm behind the fiber. A 1.6% reflector was detected within an exposure time of 8 s. The writing process became limited after this time, but the coating remained stable against ablation for several minutes.

EXAMPLE 5

Weak (0.26, 0.4, and 0.76 dB) "long period" gratings (period 434 $\mu$m) were written in a separate fiber prepared as in Example 3 (coating thickness nominally 21 $\mu$m), using a phase mask and a pulsed krypton fluoride excimer laser (output wavelength 248 nm) with a partially focused beam. In these instances, the gratings were best detected upon subsequent removal of the coating, since forward coupling of cladding modes relied upon the low refractive index provided by the air interface.

EXAMPLE 6

Another formulation of coating material was prepared as in Example 3, this time admixing the commercial resin with 2.5 phr methyl t-butyl ketone and 0.45 phr 3-mercaptopropyl trimethoxysilane. The coating was applied to an optical fiber (glass OD 125 $\mu$m) with a coating thickness of ~30 $\mu$m and photocured during drawing using a 30" Iwasaki lamp and draw speed of 1.1 m/s. Following sensitization with deuterium, a 1% Bragg reflector (period 0.5338 $\mu$m) was written in this fiber using a phase mask, a continuous wave (CW) frequency doubling (FReD) argon laser operated at 257 nm with an output power of 10 mW, a partially focused beam, and an exposure time of ~1 minute. Subsequent trials with this set-up, altering power and optical alignment, produced ~2% reflectors written through the coating.

EXAMPLE 7

Figure 5:
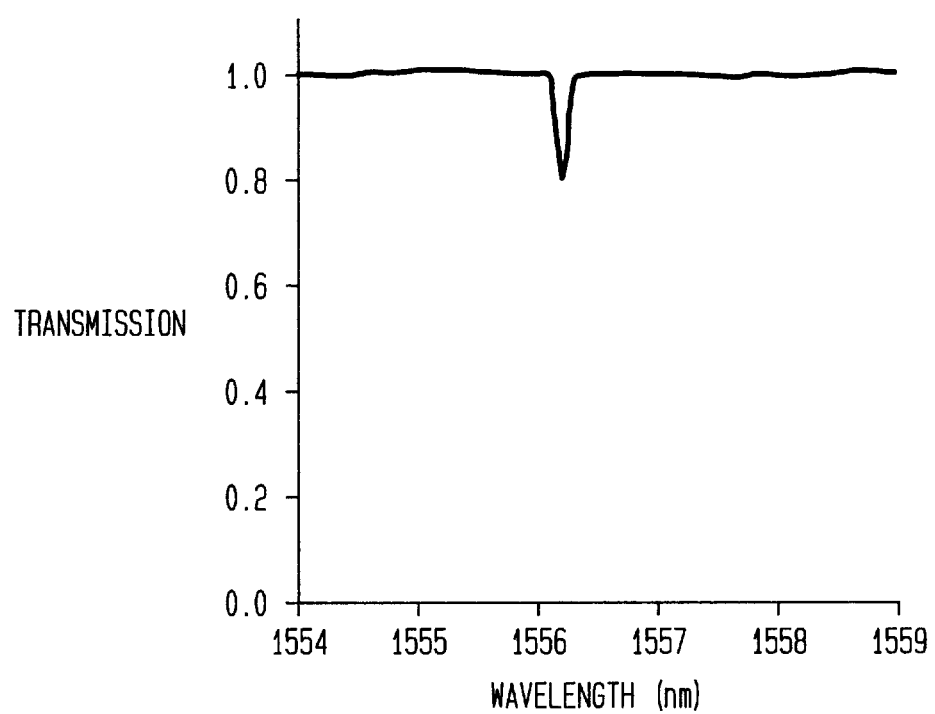
FIG. 5 is a plot of transmission vs. wavelength for a Bragg grating made according to the invention.

A 20% Bragg reflector at 1.56 $\mu$m was written in a separate length of the fiber described in Example 6 using an excimer pumped frequency doubled dye laser operated at 242 nm with an output power of 4.6 mW, a partially defocused beam, and an exposure time of less than 1 minute. The transmission plot vs. wavelength for this result is shown in FIG. 5. A second grating, a 17% reflector, was written under the same conditions.

EXAMPLE 8

The formulation described in Example 6 was coated onto an optical fiber (glass OD 125 $\mu$m) with a conventional coating thickness of ~62.5 $\mu$m and photocured using a 30" Iwasaki lamp and a draw speed of 1.1 m/s. Following sensitization with deuterium, this fiber was used to produce a 2.5% Bragg reflector using a chirped mask (center wavelength 1542 nm, chirp rate 2 Angstroms/cm, beam width 9 mm at half max), a frequency doubled dye laser operated at 242 nm with an output power of 5 mW, a partially defocused beam, and an exposure time of 80 s. Using the same set-up, but with the fiber from Examples 7, 8 (which had roughly half the coating thickness), a 6% reflector was produced.

EXAMPLE 9

Another formulation was prepared as in Example 3 using an aliphatic polyester tetra-acrylate oligomer, Sartomer Craynor™ CN920, 2.5 phr methyl t-butyl ketone and 0.45 phr 3-mercaptopropyl trimethoxysilane. The oligomer was filtered before use with an Aldrich inhibitor removing column. The UV absorption of a cured film of this resin (22 $\mu$m thick) at wavelengths >240 nm was less than that of the formulation of Example 6. The resin was coated and cured onto optical fiber as before, with a coating thickness of 62.5 $\mu$m. The fiber was then sensitized with deuterium and was used to write a ~2.5% reflector through the coating using the set-up and procedure of Example 8.

EXAMPLE 10

Another formulation was prepared by mixing 2.5 phr methyl t-butyl ketone and 0.6 phr 3-mercaptopropyl trimethoxysilane into a commercial silicone acrylate oligomer, Tego™ RC708 (Goldschmidt Chemical). The UV absorption of this material after cure was less than the formulations in the earlier examples. The coating was applied to fiber using a Fusion Systems Type H bulb, with a draw speed of 0.1 m/s and a coating thickness of ~53 $\mu$m, and the fiber was then sensitized with 1.6 mole % hydrogen. Attempts to write Bragg gratings through this coating using a CW laser produced reflectors at multiple wavelengths, which was undesirable, but writing progressed for ~2 minutes at a laser output power of 180 mW with no apparent damage to the coating—demonstrating considerable UV transparency and laser tolerance by the coating material.

EXAMPLE 11

One desirable performance property, thermo-oxidative stability, was diminished in some of the formulations described in these examples as compared with the commercial coatings. This property was evaluated by heating a few milligrams of a cured coating film under an oxygen atmosphere in a differential scanning calorimeter, and monitoring the onset temperature for the oxidation exotherm. A modified commercial (Borden) formulation containing 7 phr methyl t-butyl ketone (omitting the conventional photoinitiator and any additives) displayed an oxidation temperature of 195° C. as compared with >250° C. for the commercial coating. The oxidation temperature was increased to 262 degrees C. by the incorporation of 1 phr of a hindered amino ether, Tinuvin™ 123 (Ciba Additives). The additive contributed minimally (<10%) to an increase in UV absorbance at >240 nm.

EXAMPLE 12

Additional experiments to address thermo-oxidative stability were conducted by incorporating a thiol into the formulations described earlier. Specifically, 1 phr of pentaerythritol tetrakis (3-mercaptopropionate) was added with 5 phr methyl t-butyl ketone to the resin of Example 11, producing a film having an oxidation temperature of 223° C. versus 196° C. for the same resin without the thiol.

EXAMPLE 13

The resin of Example 11 was admixed with 3 phr methyl t-butyl ketone and 1 phr 3-mercaptopropyl trimethoxysilane and then cured as a 22 μm film between quartz disks. A similar sample was prepared, but with the additional incorporation of 1 phr Tinuvin™ 123. The tolerance of these films to CW laser exposure (wavelength 257 nm) was tested by monitoring UV transmission as a function of time over a period of ten minutes. Results for the 2 films were nearly identical, confirming no adverse effect of the Tinuvin 123 on UV transmission.

The examples given above demonstrate the effectiveness of the photoinitiator materials of the invention. It will be appreciated by those skilled in the art that the process of free radical formation proceeds relatively independently of the composition of the polymer in which the photoinitiator resides. Accordingly, the base polymer used in the invention can be any of a wide variety of photocurable resins that possess the requisite UV absorbance characteristics. Examples of free radical initiated photocure material types are (meth)acrylates, fluoro(meth)acrylates, silicone(meth) acrylates, silsesquioxane(meth)acrylates, vinyl ether/ acrylate blends, and thiolenes. Specific materials in these groups which would be expected to perform well in this invention are oligomers based on aliphatic polyester urethane acrylates, aliphatic polyether urethane acrylates, aliphatic polyester acrylates, aliphatic polyether acrylates, aliphatic hydrocarbon urethane acrylates, aliphatic hydrocarbon acrylates, perfluorinated or partially fluorinated acrylates, perfluorinated or partially fluorinated urethane acrylates, aliphatic silicone acrylates, aliphatic silsesquioxane acrylates, and copolymers or blends of the above. In general, acrylates are preferred over methacrylates for optimal cure speed. Unreactive oligomers may be used with suitable monomers, as well, to serve as fillers for viscosity modification. For hydrocarbon-based formulations, monomers such as propoxylated neopentyl glycol diacrylate, hexanediol diacrylate, tripropylene glycol diacrylate, trimethylol propane triacrylate, ethoxylated trimethylolpropane triacrylate, propoxylated glycerin triacrylate, isobornyl acrylate, cyclohexyl acrylate, caprolactone acrylate, and a variety of other mono-, di-, and multi-functional alkyl and/or alkoxylated acrylates would be expected to be useful. A particularly preferred monomer is propoxylated neopentyl glycol diacrylate, due to its low UV absorbance, and its ability to impart hardness when abrasion resistance is desired.

Commercially available photocurable resins are usually stabilized against spontaneous polymerization by the addition of inhibitors such as hydroquinone, 4-methoxy phenol, or phenothiazine. Because these materials typically absorb strongly in the cured coating at the actinic wavelengths desired for grating writing such stabilizers are preferably omitted, filtered, or removed by passage through an appropriate commercial chemisorption column. Where necessary for shelf life of the uncured coating material, a preferred stabilizer is 4-methoxy phenol at less than 250 ppm.

It will be apparent to those skilled in the art that the invention described herein is most useful with optical fibers that are manufactured by drawing a glass fiber from a glass preform, coating the fiber with a UV curable resin, and curing the coated fiber by exposure to UV radiation. It is also especially applicable to coating materials that are devoid of conjugated or unsaturated compounds, e.g. aromatic compounds, in the cured resin.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for the manufacture of a fiber grating in the core of a coated optical fiber comprising the step of exposing the core of the optical fiber to a pattern of UV radiation by directing the radiation through the coating of the optical fiber, the method characterized in that the coating of the optical fiber is a polymer containing 0.1–10% of a photoinitiator selected from the group consisting of:

(1) aliphatic ketones, and mixtures thereof, having the formula:

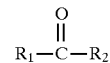

where $R_1$ and $R_2$ are the same or different alkyl moieties selected from the group consisting of methyl, ethyl, propyl, isopropyl, isobutyl, sec-butyl, t-butyl, pentyl and neopentyl, and (2) cycloaliphatic ketones as defined in (1), with R1 and R2 joined, and further where the molecular weight of the photoinitiator is greater than 100.

2. The method of claim 1 in which the coating of the optical fiber is substantially devoid of conjugated unsaturated compounds.

3. The method of claim 1 wherein the photoinitiator comprises methyl t-butyl ketone.

4. The method of claim 1 in which the photoinitiator is selected from (1).

5. Method for the manufacture of optical fiber comprising the steps of:

a. drawing a glass fiber from a glass preform, b. coating the drawn fiber with a polymerizable liquid resin containing a UV photoinitiator, and c. curing the coating on the fiber by exposing the coating to UV radiation, the invention characterized in that the photoinitiator is selected from the group consisting of:

(1) aliphatic ketones, and mixtures thereof, having the formula:

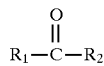

where $R_1$ and $R_2$ are the same or different alkyl moieties selected from the group consisting of methyl, ethyl, propyl, isopropyl, isobutyl, sec-butyl, t-butyl, pentyl and neopentyl, and (2) cycloaliphatic ketones as defined in (1), with R1 and R2 joined, and further where the molecular weight of the photoinitiator is greater than 100.

6. The method of claim 5 in which the resin further includes an effective amount of an additive for improving oxidative stability.

7. The method of claim 6 wherein said additive is a compound selected from the group consisting of hindered amines, hindered acylamines, and hindered aminoethers.

8. The method of claim 5 further including the step of removing volatile components after step (c) by a technique selected from the group consisting of thermal devolatization, vacuum exposure, and a combination of such techniques.

9. The method of claim 5 in which the cured coating of the optical fiber is substantially devoid of conjugated or unsaturated compounds.

10. A method for making a polymer coated optical fiber comprising the steps of:

a. coating the optical fiber with uncured polymerizable liquid material, and b. exposing the coated optical fiber to UV radiation to cure the polymer, the invention characterized in that the uncured polymer coating contains an effective amount of a photoinitiator with a molecular weight greater than 100 and selected from the group consisting of:

(1) aliphatic ketones, and mixtures thereof, having the formula:

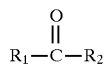

where $R_1$ and $R_2$ are the same or different alkyl moieties selected from the group consisting of methyl, ethyl, propyl, isopropyl, isobutyl, sec-butyl, t-butyl, pentyl and neopentyl, and (2) cycloaliphatic ketones as defined in (1), with $R_1$ and $R_2$ joined.

11. The method of claim 10 in which the cured coating of the optical fiber is substantially devoid of conjugated or unsaturated compounds.

12. An optical fiber comprising a glass fiber having a core and a cladding, and a polymer coating covering the surface of the glass fiber, the invention characterized in that said coating contains a photoinitiator with a molecular weight greater than 100 and selected from the group consisting of:

(1) aliphatic ketones, and mixtures thereof, having the formula:

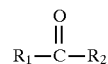

where $R_1$ and $R_2$ are the same or different alkyl moieties selected from the group consisting of methyl, ethyl, propyl, isopropyl, isobutyl, sec-butyl, t-butyl, pentyl and neopentyl, and (2) cycloaliphatic ketones as defined in (1), with $R_1$ and $R_2$ joined.

13. The optical fiber of claim 12 further including a grating formed in the core of the optical fiber.

14. An optical fiber having a polymer coating covering the surface of the optical fiber, the invention characterized in that said coating contains a photoinitiator with a molecular weight greater than 100 and selected from the group consisting of:

(1) aliphatic ketones, and mixtures thereof, having the formula:

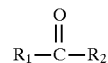

where $R_1$ and $R_2$ are the same or different alkyl moieties selected from the group consisting of methyl, ethyl, propyl, isopropyl, isobutyl, sec-butyl, t-butyl, pentyl and neopentyl, and (2) cycloaliphatic ketones as defined in (1), with $R_1$ and $R_2$ joined.

15. The method of claim 14 in which the said polymer coating of the optical fiber is substantially devoid of conjugated or unsaturated compounds.

* * * * *